United States Patent [19]
Hauck

[11] Patent Number: 5,351,365
[45] Date of Patent: Oct. 4, 1994

[54] UNIVERSAL DRAG HANDLE

[76] Inventor: Timothy G. Hauck, 220 S. Main St., Cortland, N.Y. 13045

[21] Appl. No.: 55,869

[22] Filed: May 3, 1993

[51] Int. Cl.⁵ .................. A47B 95/02; A47J 45/10; B66C 1/34; B65D 25/28
[52] U.S. Cl. .................. 16/114 R; 16/114 B; 294/82.11; 294/82.14
[58] Field of Search .................. 16/114 R, 114 B; 294/82.11, 82.14, 82.16

[56] References Cited
U.S. PATENT DOCUMENTS
2,000,659 5/1935 Carbonara .................. 16/114 B FOREIGN PATENT DOCUMENTS
1456998 1/1969 Fed. Rep. of Germany ... 294/82.14
899245 6/1962 United Kingdom ............. 294/82.11

Primary Examiner—Carmine Cuda
Attorney, Agent, or Firm—Harris Beach & Wilcox

[57] ABSTRACT

A universal drag handle for assisting in lifting and moving heavy or difficult to handle loads that includes an elongated flexible shank that further includes a heavy duty cable enclosed within a coiled spring member that is preloaded to normally support the shank in a straight line configuration. The proximal end of the cable is secured in a handle and a hook is secured to the distal end of the cable which can be used to engage an article or can be turned back and attached to the flexible shank to create an adjustable load encircling loop therein.

10 Claims, 2 Drawing Sheets

U.S. Patent   Oct. 4, 1994   Sheet 1 of 2   5,351,365
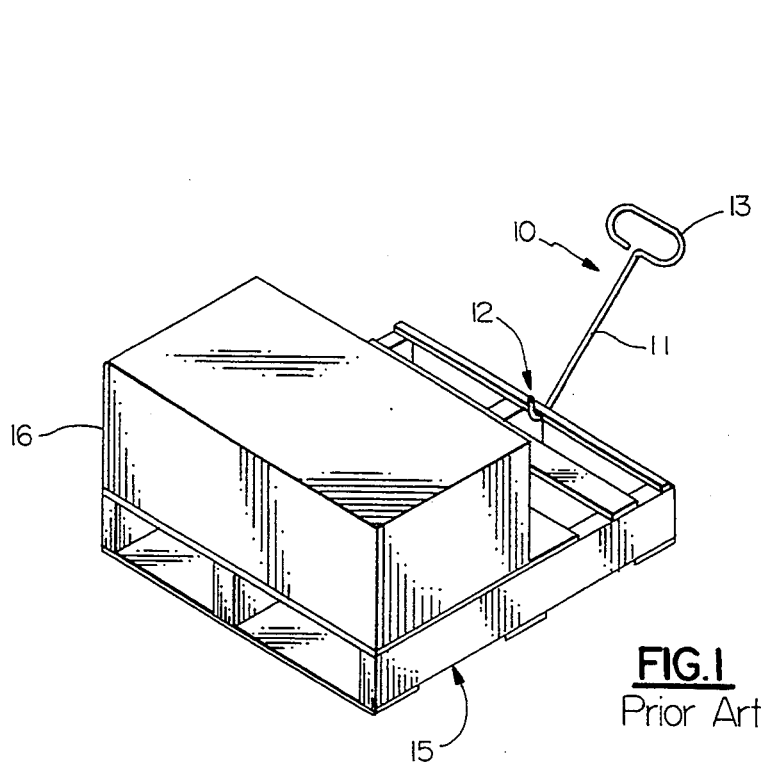
FIG.1
Prior Art
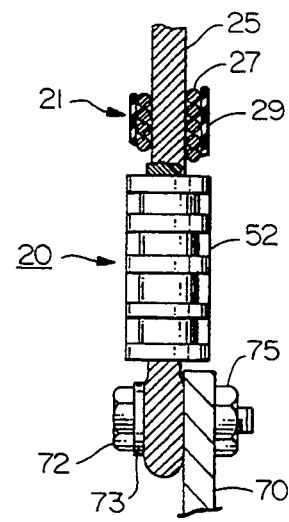
FIG.7
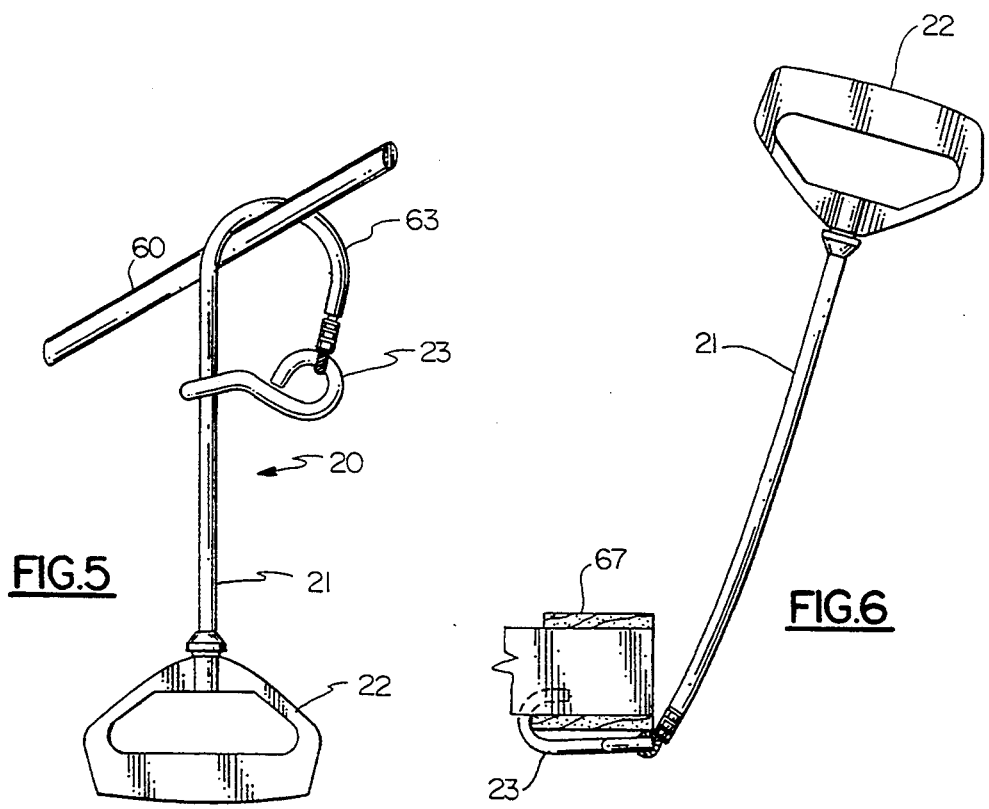
FIG.5
FIG.6

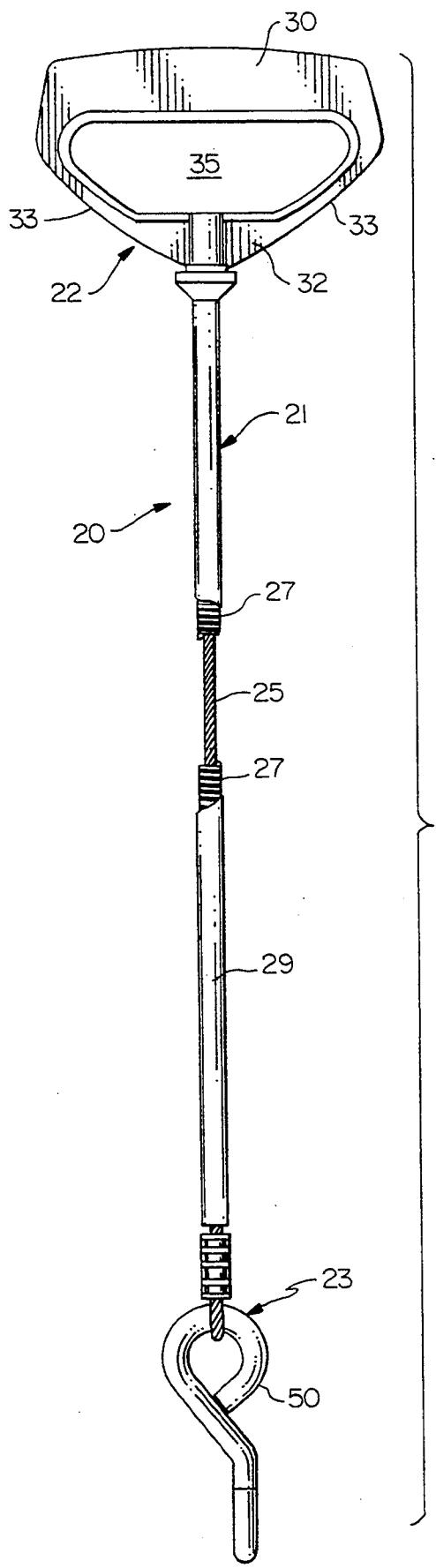
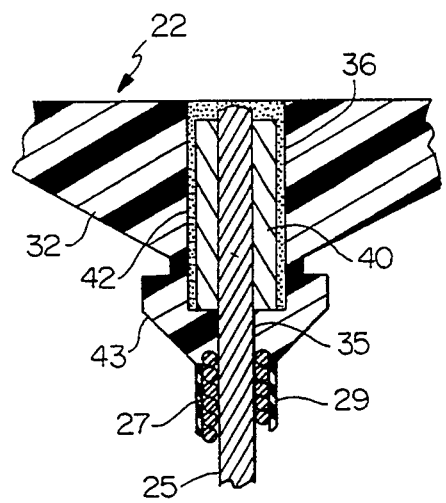
FIG.3
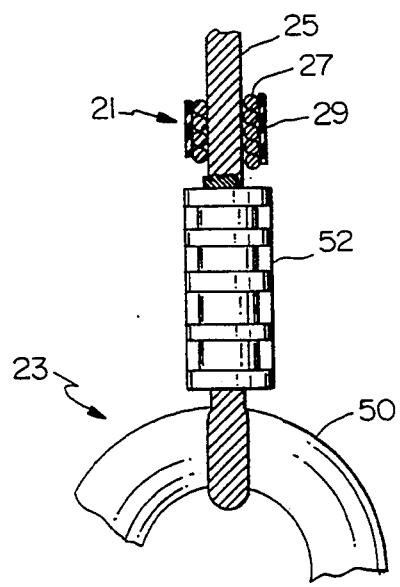
FIG.4
FIG.2

UNIVERSAL DRAG HANDLE

BACKGROUND OF THE INVENTION

This invention relates to a drag handle for assisting in the lifting and/or moving of heavy and bulky articles that are typically difficult to handle and transport.

More specifically this invention relates to a universal drag handle having great flexibility and a multitude of uses. Drag hooks have been known and used in the prior art for some time. These prior art devices are generally made from a single piece of steel rod that is bent at the distal end into a hook for engaging a load. The proximal end of the rod is similarly bent into an elongated loop that can be grasped by the user to pull or lift the engaged load.

As can be seen, these drag hooks are extremely rigid devices and, as a consequence, it is often difficult to safely and securely engage the load. Once attached to the load, the rigid drag hook may protrude from the load at an awkward angle or at an undesirable elevation. A person attempting to use the device under these adverse conditions must place his or her body in a position that is unsafe for lifting or pulling and serious bodily harm may result.

SUMMARY OF THE INVENTION

It is therefore an object of the present invention to improve devices for assisting in the lifting and moving of large heavy articles.

It is a further object of the present invention to provide for the safety of a person while lifting and moving bulky, heavy articles.

A still further object of the present invention is to provide a drag handle having a high strength elongated shank that can be bent or twisted in an infinite number of directions.

Another object of the present invention is to provide a drag handle having a flexible shank terminating in a hook such that the hook can be turned back and slidably attached to the shank to provide an adjustable load engaging loop.

Yet another object of the present invention is to provide a drag handle having an elongated shank that is normally supported in an extended position, but which can be bent or rotated into an infinite number of positions.

These and other objects of the present invention are attained by a universal drag handle for assisting in the lifting and moving of heavy or difficult to handle loads. The device includes a flexible elongated shank having a high strength flexible cable that is mounted within a helically wound spring, the coils of which are preloaded in contact one against the other to maintain the shank in a normally extended position. The proximal end of the cable is terminated in a handle and a load engaging member in the form of a hook is secured to the distal end of the cable. The shank has sufficient flexibility so that the hook can be turned back and attached to the shank to create an adjustable load engaging loop.

BRIEF DESCRIPTION OF THE DRAWINGS

For a better understanding of these and other objects of the present invention, reference will be made to the following detailed description of the invention which is to be read in conjunction with the associated drawings, wherein:

FIG. 1 is a perspective view showing a typical drag hook used in the prior art;

FIG. 2 is a side elevation with sections broken away showing a universal drag handle embodying the teachings of the present invention;

FIG. 3 is an enlarged partial view in section showing the proximal end of the flexible shank of the universal drag handle terminated in the handle of the device;

FIG. 4 is also an enlarged partial view showing a hook attached to the distal end of the flexible shank;

FIG. 5 is a perspective view showing the device of the present invention looped over an article;

FIG. 6 is a side elevation showing the device of the present invention attached to a load with the flexible shank being raised to a position whereby the load may be safely lifted or moved; and FIG. 7 is a partial side elevation in section showing the distal end of the drag handle permanently attached to an article.

DETAILED DESCRIPTION OF A PREFERRED EMBODIMENT

FIG. 1 illustrates a typical application for a rigid drag handle 10 of the type found in the prior art. As noted above, the device is formed from a single metal rod 11 that has a hook 12 at one end and an oval shaped handle 13 at the opposite end. The device is shown attached to a pallet 15 upon which is supported a load 16. The position of the drag handle to a great extent is dictated by the configuration of the load as well as the location and availability of load associated components to which the hook can be attached. Oftentimes, the position of the device will be severely restricted, as illustrated, so that the user cannot safely lift or move the load.

Referring now to FIGS. 2-6, there is shown a universal drag handle device generally referenced 20 embodying the teachings of the present invention. The unit includes an elongated flexible shank 21 that is attached at its proximal end to an oversized handle 22 and at its distal end to a metal hook member 23. The shank contains a core element 25 that is a high strength cable wound from stainless steel strands. The cable is contained in a helically wound spring 27 also formed of stainless steel. The coils of the spring are prestressed into contiguous contact so that the spring normally assumes a linear or straight line configuration. However, the shank, because of its construction, has sufficient flexibility so that it can be bent into a tight loop and also twisted about its axis. The shank is covered with a flexible sheath 29 that is preferably a heat shrinkable plastic sleeve.

The handle 22 is molded of a single piece of plastic and includes an upper hand grip 30 that is joined to a base section 32 by means of a pair of arms 33—33. The legs and hand grip encircle a generous opening 35 so that a user of the device can conveniently grip the handle with both hands. With further reference to FIG. 3, the base section of the handle contains a hole 35 passing therethrough that has an expanded chamber 36 at the upper end thereof. The proximal end of the cable is passed upwardly through the hole into the expanded chamber and a metal terminator unit 40 is securely crimped thereon to prevent the proximal end of the cable from passing back through the hole. The expanded opening is filled with an epoxy resin 42 to secure the terminator unit therein. The spring member 27 and the outer sheath of the shank 21 are seated in contact against flange 43 of the base section.

Turning now to FIG. 4, the metal hook member 23 located at the distal end of the shank is provided with an eye 50 through which the distal end of the cable 25 is looped or turned back upon itself. The turned end of the cable, after being brought through the eye, is placed in parallel alignment with the main body of the cable and is clamped in locking contact therewith using a swage 51. The distal end of the spring member 27 and the sheath 29 are terminated adjacent to the swage. The hook member is preferably covered with a plastic coating which will help prevent an engaged load from being scratched or otherwise damaged.

FIG. 5 illustrates one application of the present invention wherein the flexible shank 21 is looped over a load component 60 and the hook operatively attached to the shank to create an adjustable loop 63. Exerting a pulling force on the handle draws the loop tightly around the load component 60, thus securely attaching the universal drag handle to the load.

FIG. 6 illustrates a second application of the present invention wherein the hook 23 is brought under a load bearing pallet 67. As can be seen, the flexible shank of the device allows the handle 22 to be raised to any desired position wherein the user can safely lift or pull the load using his or her legs.

With further reference to FIG. 7, there is shown the drag handle 20 of the present invention permanently attached to an article 70 such as the front end of a lawn tractor, boat trailer or the like that might require repeated lifting or transporting. In this application, the hook member is removed from the distal end of the cable and a loop 71 is formed at the bottom end of the cable by bringing the cable around upon itself and closing the loop using the swage 52. A bolt 72 is passed through the loop and a hole formed in the article. A washer 73 is placed between the loop and the bolt head and the cable is locked against the article by tightening down the nut 75 that is threaded onto the free end of the bolt.

The shank of the permanently affixed handle is shortened to a length such that the device will be self-supporting and not bend under its own weight.

While this invention has been explained with reference to the structure disclosed herein, it is not confined to the details set forth and this application is intended to cover any modifications and changes as may come within the scope of the following claims:

What is claimed is:

1. Apparatus for assisting in the lifting and moving of a heavy or difficult to handle load that includes:
   an elongated flexible member that includes a flexible high strength core means the entire length of which is enclosed within a cylindrical helically wound spring means that is preloaded to normally support said member in a straight line configuration,
   a handle means secured to one end of said core means, said handle means having a hand engageable gripping means, and
   attaching means secured to the other end of said core that can be removably secured to a load or to said flexible member to form a loop therein.

2. The apparatus of claim 1 wherein said core means is a cable formed of stainless steel.

3. The apparatus of claim 1 wherein said attaching means is a hook means.

4. The apparatus of claim 1 wherein said one end of said core means passes into an opening in said handle means and further includes a radially expanded terminating means secured to said one end of the core means, said terminating means being seated within a blind recess formed in said handle means whereby the core means is prevented from pulling out of said handle means when placed under load.

5. The apparatus of claim 4 wherein the terminating means is secured in said recess by an adhesive means.

6. The apparatus of claim 1 that further includes a sheath means for covering the outside of said flexible member.

7. The apparatus of claim 1 wherein said sheath means is a heat shrinkable plastic sleeve.

8. The apparatus of claim 3 wherein said hook means is formed of steel and contains a protective plastic outer coating.

9. Apparatus for assisting in the lifting and transporting of a heavy or difficult to handle article that includes:
   an elongated flexible member that includes a flexible cable the entire length of which is enclosed within a helically wound spring that is preloaded to support said member in a straight line configuration,
   a handle means secured to one end of said member, and
   means to permanently attach the other end of said member to an article.

10. The apparatus of claim 9 wherein said last mentioned means is a bolting means threadably attached to said article.

* * * * *